US010297392B2

(12) United States Patent
Petrzilek et al.

(10) Patent No.: US 10,297,392 B2
(45) Date of Patent: May 21, 2019

(54) TEMPERATURE STABLE SOLID ELECTROLYTIC CAPACITOR

(71) Applicant: AVX Corporation, Fountain Inn, SC (US)

(72) Inventors: Jan Petrzilek, Usti nad Orlici (CZ); Martin Biler, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 15/387,795

(22) Filed: Dec. 22, 2016

(65) Prior Publication Data
US 2017/0148574 A1    May 25, 2017

Related U.S. Application Data

(63) Continuation of application No. 13/941,710, filed on Jul. 15, 2013, now Pat. No. 9,536,673.
(Continued)

(51) Int. Cl.
*H01G 9/00* (2006.01)
*H01G 9/15* (2006.01)
(Continued)

(52) U.S. Cl.
CPC .......... *H01G 9/025* (2013.01); *H01G 9/0036* (2013.01); *H01G 9/028* (2013.01); *H01G 9/052* (2013.01); *H01G 9/15* (2013.01); *Y10T 29/417* (2015.01)

(58) Field of Classification Search
CPC ...... H01G 9/025; H01G 9/0036; H01G 9/052; H01G 9/25; H01G 9/00; H01G 9/0032
(Continued)

(56) References Cited

U.S. PATENT DOCUMENTS 3,440,495 A    4/1969    Howard et al.
3,922,773 A    12/1975    Marien et al.
(Continued)

FOREIGN PATENT DOCUMENTS

JP    S58147023 A    9/1983
JP    H0364014 A    3/1991
(Continued)

OTHER PUBLICATIONS

Abstract of Japanese Patent—JP2001257130, Sep. 21, 2001, 2 pages.
(Continued)

*Primary Examiner* — Michael P McFadden
(74) *Attorney, Agent, or Firm* — Dority & Manning, P.A.

(57) ABSTRACT

A capacitor whose electrical properties can be stable under a variety of different conditions is provided. The solid electrolyte of the capacitor is formed from a combination of an in situ polymerized conductive polymer and a hydroxy-functional nonionic polymer. One benefit of such an in situ polymerized conductive polymer is that it does not require the use of polymeric counterions (e.g., polystyrenesulfonic anion) to compensate for charge, as with conventional particle dispersions, which tend to result in ionic polarization and instable electrical properties, particularly at the low temperatures noted above. Further, it is believed that hydroxy-functional nonionic polymers can improve the degree of contact between the polymer and the surface of the internal dielectric, which unexpectedly increases the capacitance performance and reduces ESR.

13 Claims, 1 Drawing Sheet

Related U.S. Application Data

(60) Provisional application No. 61/673,412, filed on Jul. 19, 2012.

(51) Int. Cl.
  *H01G 9/025* (2006.01)
  *H01G 9/028* (2006.01)
  *H01G 9/052* (2006.01)

(58) Field of Classification Search
  USPC ........................................................ 361/523
  See application file for complete search history.

(56) References Cited

U.S. PATENT DOCUMENTS

| | | |
|---|---|---|
| 4,131,520 A | 12/1978 | Bernard et al. |
| 4,278,513 A | 7/1981 | Millard et al. |
| 4,479,168 A | 10/1984 | Green, Jr. |
| 4,508,563 A | 4/1985 | Bernard et al. |
| 4,747,109 A | 5/1988 | Taneya et al. |
| 4,910,645 A | 3/1990 | Jonas et al. |
| 5,436,796 A * | 7/1995 | Abe ............... H01G 9/025 252/511 |
| 5,457,862 A | 10/1995 | Sakata et al. |
| 5,473,503 A | 12/1995 | Sakata et al. |
| 5,560,761 A | 10/1996 | Naito |
| 5,586,000 A | 12/1996 | Sakata et al. |
| 5,643,432 A | 7/1997 | Qiu |
| 5,694,287 A | 12/1997 | Nishiyama et al. |
| 5,729,428 A | 3/1998 | Sakata et al. |
| 6,231,993 B1 | 5/2001 | Stephenson et al. |
| 6,261,434 B1 | 7/2001 | Melody et al. |
| 6,308,001 B1 | 10/2001 | Nair et al. |
| 6,350,406 B1 | 2/2002 | Satou et al. |
| 6,674,635 B1 | 1/2004 | Fife et al. |
| 6,798,644 B1 | 9/2004 | Piller et al. |
| 6,804,109 B1 | 10/2004 | Hahn et al. |
| 6,958,198 B2 | 10/2005 | Iwamoto et al. |
| 6,987,663 B2 | 1/2006 | Merker et al. |
| 7,118,690 B2 | 10/2006 | Wessling et al. |
| 7,221,554 B2 | 5/2007 | Brenneman et al. |
| 7,279,015 B2 | 10/2007 | Merker |
| 7,304,832 B2 | 12/2007 | Ushio et al. |
| 7,377,947 B2 | 5/2008 | Merker et al. |
| 7,411,779 B2 | 8/2008 | Merker et al. |
| 7,515,396 B2 | 4/2009 | Biler |
| 7,563,290 B2 | 7/2009 | Qiu et al. |
| 7,679,885 B2 | 3/2010 | Mizusaki et al. |
| 7,724,502 B2 | 5/2010 | Petrzilek et al. |
| 7,750,099 B2 | 7/2010 | Chikusa et al. |
| 7,785,493 B2 | 8/2010 | Jonas et al. |
| 7,898,794 B2 | 3/2011 | Haas et al. |
| 7,948,069 B2 | 5/2011 | Zhuang |
| 7,972,534 B2 | 7/2011 | Merker et al. |
| 7,973,180 B2 | 7/2011 | Morita et al. |
| 7,990,683 B2 | 8/2011 | Qui et al. |
| 8,058,135 B2 | 11/2011 | Merker et al. |
| 8,094,434 B2 | 1/2012 | Rawal et al. |
| 8,124,277 B2 | 2/2012 | Anada et al. |
| 8,125,768 B2 | 2/2012 | Horacek et al. |
| 8,194,395 B2 | 6/2012 | Zednicek et al. |
| 8,279,583 B2 | 10/2012 | Zednicek et al. |
| 8,279,584 B2 | 10/2012 | Zednickova |
| 8,308,825 B2 | 11/2012 | Freeman et al. |
| 8,310,815 B2 | 11/2012 | Freeman et al. |
| 8,313,538 B2 | 11/2012 | Merker et al. |
| 8,323,361 B2 | 12/2012 | Freeman et al. |
| 8,349,030 B1 | 1/2013 | Hussey et al. |
| 8,355,242 B2 | 1/2013 | Vile et al. |
| 8,405,958 B2 | 3/2013 | Takahashi et al. |
| 8,456,803 B2 | 6/2013 | Merker et al. |
| 8,824,122 B2 | 9/2014 | Vilc et al. |
| 8,848,342 B2 | 9/2014 | Uher et al. |
| 8,945,485 B2 | 2/2015 | Chen et al. |
| 9,030,807 B2 | 5/2015 | Chacko et al. |
| 9,384,866 B2 | 7/2016 | Jibiki et al. |
| 9,488,625 B2 | 11/2016 | Felgenhauer et al. |
| 9,508,491 B2 | 11/2016 | Merker et al. |
| 2004/0190227 A1* | 9/2004 | Takatani ............ H01G 9/042 361/532 |
| 2005/0111165 A1* | 5/2005 | Merker .............. H01G 9/10 361/525 |
| 2007/0171596 A1 | 7/2007 | Chacko et al. |
| 2010/0157510 A1 | 6/2010 | Miyachi et al. |
| 2011/0019339 A1 | 1/2011 | Merker et al. |
| 2011/0168946 A1 | 7/2011 | Loevenich et al. |
| 2011/0182002 A1* | 7/2011 | Takahashi .......... C08L 65/00 361/524 |
| 2012/0044615 A1 | 2/2012 | Takahashi et al. |
| 2012/0057275 A1 | 3/2012 | Intelmann et al. |
| 2012/0063063 A1 | 3/2012 | Qiu et al. |
| 2012/0106031 A1 | 5/2012 | Vilc et al. |
| 2012/0206860 A1 | 8/2012 | Chen et al. |
| 2013/0070393 A1 | 3/2013 | Kamiyama et al. |
| 2013/0261261 A1 | 10/2013 | Lövenich |
| 2013/0279079 A1* | 10/2013 | Merker ............. H01G 9/0029 361/528 |
| 2013/0295389 A1 | 11/2013 | Ishikawa et al. |
| 2013/0300370 A1 | 11/2013 | Hotta |
| 2014/0022702 A1 | 1/2014 | Petrzilek et al. |
| 2014/0022704 A1 | 1/2014 | Petrzilek et al. |
| 2014/0078646 A1 | 3/2014 | Chacko et al. |
| 2014/0340819 A1 | 11/2014 | Zhang et al. |
| 2015/0029642 A1 | 1/2015 | Shi et al. |
| 2015/0364263 A1 | 12/2015 | Petrzilek et al. |

FOREIGN PATENT DOCUMENTS

| | | |
|---|---|---|
| JP | H0453115 A | 2/1992 |
| JP | H0869946 A | 3/1996 |
| JP | 2003168633 | 6/2003 |
| JP | 2008182056 A | 8/2008 |
| JP | 2008205496 A | 9/2008 |
| JP | 2010129864 A | 6/2010 |
| JP | 2011134846 A | 7/2011 |
| JP | 2011151205 A | 8/2011 |
| JP | 2011253878 A | 12/2011 |
| WO | WO2012/041506 A2 | 4/2012 |
| WO | WO2012/041506 A3 | 4/2012 |
| WO | WO2012/048824 A1 | 4/2012 |
| WO | WO2012/119711 A1 | 9/2012 |
| WO | WO2012/136305 A1 | 10/2012 |

OTHER PUBLICATIONS

Abstract of Japanese Patent—JP2010090397, Apr. 22, 2010, 1 page.
Abstract of Japanese Patent—JPH01140621, Jun. 1, 1989, 1 page.
Abstract of Japanese Patent—JPH03109712, May 9, 1991, 2 pages.
Abstract of Japanese Patent—JPH03109713, May 9, 1991, 2 pages.
Abstract of Japanese Patent—JPH03109714, May 9 1991, 2 pages.
Abstract of Japanese Patent—JPH03127813, May 30, 1991 1 page.
Abstract of WO Patent—WO2010015468, Feb. 11, 2010, 1 page.
Article—Baku et al., "Sintering and electrical properties of tantalum anodes for capacitor applications," *Materials Letters*, vol. 56, 2002, 560-563.
Article—Freeman et al., "Critical oxygen content in porous anodes of solid tantalum capacitors," *Journal of Materials Science: Materials in Electronics*, vol. 9, 1998, pp. 309-311.
Article—Helmut Haas, "Magnesium Vapour Reduced Tantalum Powders with Very High Capacitances," *CARTS Europe 2004*, 18th Annual Passive Components Conference, Oct. 18, 21, 2004, 4 pages.
Article—Pozdeev-Freeman et al., "Critical oxygen content in porous anodes of solid tantalum capcitors" *Journal of Materials Science: Materials in Electronics*, vol. 9, 1998, pp. 309-311.
Article—Simkins et al., "Tantalum Powders for High Voltage Applications II," *CARTS 2004*, 24th Annual Capacitor and Resistor Technology Symposium, Mar. 29-Apr. 1, 2004.
Machine Translation or Japanese Patent—JP2005217129, Aug. 11, 2005, 11 pages.

(56) References Cited

OTHER PUBLICATIONS

Material Safety Data Sheet from MetLab Corporation on Polyethylene Glycol, Jan. 2001, 7 pages.
Paper—Bates et al., "Reaching the Highest Reliability for Tantalum Capacitors," *CARTS International 2013*, Mar. 25-28, 2013, 12 pages.
Paper—Freeman et al., "How High Working Voltage Can Go in Polymer Tantalum Capacitors," CARTS USA 2001, Jacksonville, Florida, Mar. 28-31, 2011, 15 pages.
Paper—Freeman et al., "Electrical Characterization of Polymer Tantalum Capacitors with Poly(3,4-Ethylenedioxythiophene) Cathode," Journal of the Electrochemical Society, vol. 156; No. 6, 2009, 10 pages and CARTS Europe 2008, Helsinki, Finland, Oct. 20-23, 2008.
Paper—Freeman et al., "How Far We Can Go with Hi CV Ta Capacitors," CARTS Europe 2004, 18$^{th}$ Annual Passive Components Conference, Oct. 18-21, 2004.
Paper—Freeman et al., "Low Voltage CV Loss in Tantalum Capacitors," CARTS USA 2010, New Orleans, LA, Mar. 16, 2010, 12 pages.
Paper—Freeman et al., "Reliability and Critical Applications of Tantalum Capacitors," CARTS Europe 2007 Symosium, Oct.-Nov. 2007, Barcelona, Spain, pp. 193-204.
Paper—Freeman, et al., "Stable, Reliable, and Efficient Tantalum Capacitors," CARTS USA 2008, 28$^{th}$ Symposium for Passive Electronics, March Newport Beach, California, 6 pages.
Paper—Merker et al., "Conducting Polymer Dispersions for High-Capacitance Tantalum Capacitors," CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Petrzilek et al., "Hermetically Sealed SMD Tantalum Capacitors," *CARTS USA 2012*, 6 pages.
Paper—Petrzilek et al., "Next Generations of High Voltage, Low ESR Tantalum Conductive Polymer Capacitors," *CARTS USA 2011*, Jacksonville, Florida Mar. 28-31, 2011, 9 pages.
Paper—Simpson et al., "Advances and Applications of Inherently Conductive Polymer Technologies Based on Poly(3,4-Ethylenedioxythiophene)," 2005 AIMCAL Fall Technical Conference and 19$^{th}$ International Vacuum Web Coating Conference, Oct. 16-20, 2005, Session 5: Advances in Technology. Myrtle Beach, SC, 10 pages.
Paper—Young et al., "High Voltage Tantalum Polymer Capacitors," CARTS Europe 2008, Helsinki, Finland, Oct. 20-23, 2008.
Pape—Young et al., "Performance and Reliability Study of High Voltage Tantalum Polymer Capacitors," 2010 Conference Proceedings, CARTS 2010 Conference, New Orleans, LA, Apr. 2010, 13 pages.
Paper—Zednicek et al., "Hermetically Sealed 230C MnO$_2$ Tantalum Capacitors," *CARTS International 2013*, Mar. 25-28, 2013, 8 pages.
Presentation—Freeman et al., "Hermetically Sealed Polymer Tantalum Capacitors," CMSE Europe 2010.
Press Release—AVX's new 125V Tantalum Polymer SMD Capacitors Surpass Previous 100V Milestone, Jun. 24, 2013, 2 pages.
Product Information for Tantalum Polymer Through-Hole Capacitors, T550 Polymer Hermetic Seal (PHS) Series, from Kemet, 2011, 2 pages.
Thesis—Brian Holtman, "The Electrical Characterization of Tantalum Capacitors as MIS Devices," Aug. 2008, Clemson University, 128 pages.
Thesis—Githin Francis Alapatt, "Investigating Pre-Breakdown Currents in Polymer Tantalum Capacitors," Aug. 2010, Clemson University, 102 pages.

* cited by examiner

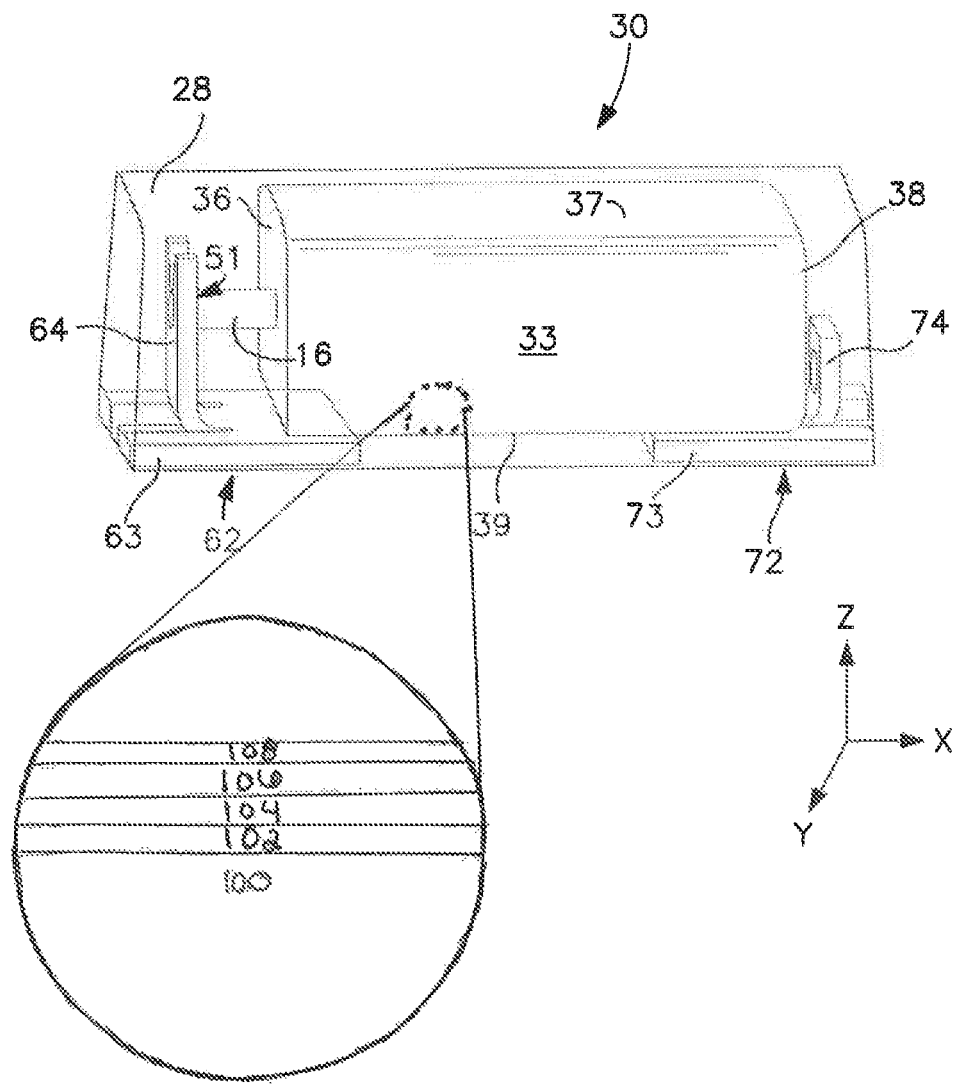

TEMPERATURE STABLE SOLID ELECTROLYTIC CAPACITOR

CROSS REFERENCE TO RELATED APPLICATIONS

The present application is a continuation of U.S. application Ser. No. 13/941,710, filed on Jul. 15, 2013, which claims priority to U.S. Provisional Application Ser. No. 61/673,412, filed on Jul. 19, 2012, which are incorporated herein in their entirety by reference thereto.

BACKGROUND OF THE INVENTION

Solid electrolytic capacitors (e.g., tantalum capacitors) are typically made by pressing a metal powder (e.g., tantalum) around a metal lead wire, sintering the pressed part, anodizing the sintered anode, and thereafter applying a solid electrolyte. Intrinsically conductive polymers are often employed as the solid electrolyte due to their advantageous low equivalent series resistance ("ESR") and "non-burning/non-ignition" failure mode. Recently, conductive polymer slurries that contain a complex of poly(3,4-ethylenedioxythiophene) and polystyrenesulfonic acid ("PEDT:PSS complex") have been employed as a solid electrolyte material due to their ability to handle high voltages, such as experienced during a fast switch on or operational current spike. While some benefits have been achieved, one problem with polymer slurry-based capacitors is that their capacitance is highly temperature dependent. For example, the capacitance tends to drop significantly at low temperatures (e.g., −55° C.), which can prevent the use of such capacitors in cold temperature environments, such as often experienced in aerospace or military applications.

As such, a need currently exists for a solid electrolytic capacitor having improved stability at a wide variety of different temperatures.

SUMMARY OF THE INVENTION

In accordance with one embodiment of the present invention, a solid electrolytic capacitor is disclosed that comprises a sintered porous anode, a dielectric layer that overlies the anode body, and a solid electrolyte overlying the dielectric layer. The solid electrolyte comprises an in situ polymerized conductive polymer and a hydroxy-functional nonionic polymer.

In accordance with another embodiment of the present invention, a method for forming a solid electrolytic capacitor is disclosed that comprises anodically oxidizing a sintered porous anode to form a dielectric layer that overlies the anode and forming a solid electrolyte over the dielectric layer by a process that includes chemically polymerizing a monomer in situ to form a conductive polymer, and thereafter, applying a hydroxy-functional nonionic polymer.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended FIGURE in which:

FIG. 1 is a schematic illustration of one embodiment of a capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a capacitor whose electrical properties can be stable under a variety of different conditions. For example, the capacitance and/or equivalent series resistance ("ESR") of the capacitor may remain relatively stable at low temperatures, such as about 25° C. or less, in some embodiments about 10° C. or less, in some embodiments about 0° C. or less, and in some embodiments, from about −75° C. to about −25° C. (e.g., −55° C.), as well as at a wide range of frequencies, such from about 10 Hz to about 100 kHz. Even under such conditions, the capacitance may still be relatively high. For example, the capacitor can exhibit a relatively high percentage of its wet capacitance, which enables it to have only a small capacitance loss and/or fluctuation in the presence of atmosphere humidity. This performance characteristic is quantified by the "wet-to-dry capacitance percentage", which is determined by the equation:

Wet-to-Dry Capacitance=(Dry Capacitance/Wet Capacitance)×100

The capacitor of the present invention, for instance, may exhibit a wet-to-dry capacitance percentage of about 50% or more, in some embodiments about 60% or more, in some embodiments about 70% or more, and in some embodiments, from about 80% to 100%. In addition to a stable capacitance, the capacitor may also maintain a low equivalence series resistance ("ESR") under the conditions noted above, such as less than about 100 mohms, in some embodiments less than about 75 mohms, in some embodiments from about 0.01 to about 60 mohms, and in some embodiments, from about 0.05 to about 50 mohms, measured at an operating frequency of 100 kHz.

The present inventors have discovered that the ability to achieve such good electrical performance can be achieved through a unique and controlled combination of features relating, at least in part, to the solid electrolyte. More particularly, the solid electrolyte is formed from a combination of an in situ polymerized conductive polymer and a hydroxy-functional nonionic polymer. One benefit of such an in situ polymerized conductive polymer is that it does not require the use of polymeric counterions (e.g., polystyrenesulfonic anion) to compensate for charge, as with conventional particle dispersions, which tend to result in ionic polarization and instable electrical properties, particularly at the low temperatures noted above. Further, it is believed that hydroxy-functional nonionic polymers can improve the degree of contact between the polymer and the surface of the internal dielectric, which unexpectedly increases the capacitance performance and reduces ESR.

Various embodiments of the present invention will now be described in more detail.

I. Anode

The anode, as may be generally shown by reference numeral 100, is formed from a valve metal composition. The specific charge of the composition may vary, such as from about 5,000 μF*V/g to about 250,000 μF*V/g, in some embodiments from about 25,000 μF*V/g to about 200,000 μF*V/g or more, and in some embodiments, from about 50,000 to about 150,000 μF*V/g. As is known in the art, the specific charge may be determined by multiplying capacitance by the anodizing voltage employed, and then dividing this product by the weight of the anodized electrode body.

The valve metal composition generally contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode, a powder of the valve metal composition is generally employed. The powder may contain particles any of a variety of shapes, such as nodular, angular, flake, etc., as well as mixtures thereof. The bulk density (also known as Scott density) of the powder may be from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the powder sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, N.J. The particles may also have an average size (e.g., width) of from about 0.1 to about 100 micrometers, in some embodiments from about 0.5 to about 70 micrometers, and in some embodiments, from about 1 to about 50 micrometers.

To facilitate the construction of the anode, certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoroolefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

After compaction, the resulting anode body may then be diced into any desired shape, such as square, rectangle, circle, oval, triangle, hexagon, octagon, heptagon, pentagon, etc. The anode body may also have a "fluted" shape in that it contains one or more furrows, grooves, depressions, or indentations to increase the surface to volume ratio to minimize ESR and extend the frequency response of the capacitance. The anode body may then be subjected to a heating step in which most, if not all, of any binder/lubricant are removed. For example, the anode body is typically heated by an oven that operates at a temperature of from about 150° C. to about 500° C. Alternatively, the binder/lubricant may also be removed by contacting the pellet with an aqueous solution, such as described in U.S. Pat. No. 6,197,252 to Bishop, et al.

Thereafter, the pellet is sintered to form a porous, integral mass. The temperature, atmosphere, and time of the sintering may depend on a variety of factors, such as the type of anode, the size of the anode, etc. Typically, sintering occurs at a temperature of from about from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

The anode may also have a relatively low carbon and oxygen content. For example, the anode may have no more than about 50 ppm carbon, and in some embodiments, no more than about 10 ppm carbon. Likewise, the anode may have no more than about 3500 ppm oxygen, in some embodiments no more than about 3000 ppm oxygen, and in some embodiments, from about 500 to about 2500 ppm oxygen. Oxygen content may be measured by LECO Oxygen Analyzer and includes oxygen in natural oxide on the tantalum surface and bulk oxygen in the tantalum particles. Bulk oxygen content is controlled by period of crystalline lattice of tantalum, which is increasing linearly with increasing oxygen content in tantalum until the solubility limit is achieved. This method was described in "Critical Oxygen Content In Porous Anodes Of Solid Tantalum Capacitors", Pozdeev-Freeman et al., Journal of Materials Science: Materials In Electronics 9, (1998) 309-311 wherein X-ray diffraction analysis (XRDA) was employed to measure period of crystalline lattice of tantalum. Oxygen in sintered tantalum anodes may be limited to thin natural surface oxide, while the bulk of tantalum is practically free of oxygen.

As noted above, an anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

II. Dielectric

The anode, as generally shown by reference numeral 100, is also coated with a dielectric, which may be generally shown by reference numeral 102. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 40 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

III. Solid Electrolyte

A solid electrolyte, such as generally shown by reference numeral 104, overlies the dielectric, as generally shown by reference numeral 102, that generally functions as the cathode for the capacitor. The solid electrolyte contains a conductive polymer, which is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

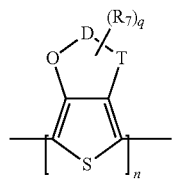

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{15}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

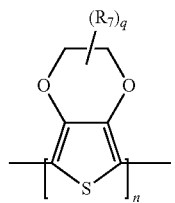

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

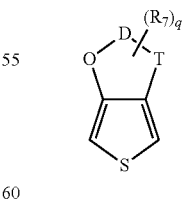

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

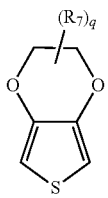

wherein, $R_7$ and q are as defined above. In one particular embodiment, "q" is 0. One commercially suitable example of 3,4-ethylenedioxthiophene is available from H. C. Starck GmbH under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

To form an in situ polymerized layer, the monomers are chemically polymerized in the presence of an oxidative catalyst. The oxidative catalyst typically includes a transition metal cation, such as iron(III), copper(II), chromium (VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to an in situ polymerized conductive polymer, the solid electrolyte also contains a hydroxy-functional nonionic polymer. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the polymer particles and the surface of the internal dielectric, which is typically relatively smooth in nature as a result of higher forming voltages. This unexpectedly increases the capacitance of the resulting capacitor at low temperatures. Furthermore, it is believed that the use of a hydroxy-functional polymer with a certain molecular weight can also minimize the likelihood of chemical decomposition. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The diol component may be selected, in particular, from saturated or unsaturated, branched or unbranched, aliphatic dihydroxy compounds containing 5 to 36 carbon atoms or aromatic dihydroxy compounds, such as, for example, pentane-1,5- diol, hexane-1,6-diol, neopentyl glycol, bis-(hydroxymethyl)-cyclohexanes, bisphenol A, dimer diols, hydrogenated dimer diols or even mixtures of the diols mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10\text{-}16}$—$(O$—$C_2H_4)_{1\text{-}25}$—$OH$ (e.g., octaethylene glycol monododecyl ether and pentaethylene glycol monododecyl ether); polyoxypropylene glycol alkyl ethers having the general formula: $CH_3$—$(CH_2)_{10\text{-}16}$—$(O$—$C_3H_6)_{1\text{-}25}$—$OH$; polyoxyethylene glycol octylphenol ethers having the following general formula: $C_8H_{17}$—$(C_6H_4)$—$(O$—$C_2H_4)_{1\text{-}25}$—$OH$ (e.g., Triton™ X-100); polyoxyethylene glycol alkylphenol ethers having the following general formula: $C_9H_{19}$—$(C_6H_4)$—$(O$—$C_2H_4)_{1\text{-}25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the hydroxy-functional polymer may simply be incorporated into any layer(s) formed by the in situ polymerization process described above. In such embodiments, the concentration of the hydroxy-functional polymer in the polymerization solution may be from about 1 wt. % to about 50 wt. %, in some embodiments from about 5 wt. % to about 40 wt. %, and in some embodiments, from about 10 wt. % to about 30 wt. %.

In other embodiments, however, the hydroxy-functional polymer may be applied after the initial polymer layer(s) are formed. In such embodiments, the technique used to apply the hydroxy-functional polymer may vary. For example, the polymer may be applied in the form of a liquid solution using various methods, such as immersion, dipping, pouring, dripping, injection, spraying, spreading, painting or printing, for example, inkjet, screen printing or tampon printing. Solvents known to the person skilled in the art can be employed in the solution, such as water, alcohols, or a mixture thereof. The concentration of the hydroxy-functional polymer in such a solution typically ranges from about 5 wt. % to about 95 wt. %, in some embodiments from about 10 wt. % to about 70 wt. %, and in some embodiments, from about 15 wt. % to about 50 wt. % of the solution. If desired, such solutions may be generally free of conductive polymers. For example, conductive polymers may constitute about 2 wt. % or less, in some embodiments about 1 wt. % or less, and in some embodiments, about 0.5 wt. % or less of the solution.

Alternatively, however, it may also be desired to employ a conductive polymer in combination with the hydroxy-functional polymer. For example, in certain embodiments, a polymer dispersion that contains conductive polymer particles and a hydroxy-functional polymer may be applied to the anode after the initial layer(s) formed from in situ polymerization are applied. One benefit to employing such a dispersion is that it may be able to increase the adhesion and coverage of the in situ polymerized layer(s). In this regard, the particles employed in the dispersion typically have a small size, such as an average diameter of from about 1 to about 200 nanometers, in some embodiments from about 2 to about 150 nanometers, and in some embodiments, from about 5 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization.

In addition to conductive polymer(s) and counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the solid electrolyte and the ability to apply it to the anode part. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The polymeric dispersion may be applied by to the part using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of $100\ s^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness.

Regardless of the particular manner in which it is formed, the concentration of the hydroxy-functional polymer in the polymer dispersion is typically from about 1 wt. % to about 50 wt. %, in some embodiments from about 5 wt. % to about 40 wt. %, and in some embodiments, from about 10 wt. % to about 30 wt. %. Likewise, in those embodiments in which the hydroxy-functional polymer is employed in a polymer dispersion, it may also be desirable that the in situ polymerized layer(s) are generally free of such hydroxy-functional nonionic polymers. For example, hydroxy-functional polymers may constitute about 2 wt. % or less, in some embodiments about 1 wt. % or less, and in some embodiments, about 0.5 wt. % or less of the in situ polymerized layer(s). Once applied, the layer formed by the polymer dispersion may be dried and/or washed. One or more additional layers may also be formed in this manner to achieve the desired thickness. Typically, the total thickness of the layers formed by the polymer dispersion is from about 1 to about 50 μm, and in some embodiments, from about 5 to about 20 μm.

IV. External Polymer Coating

Although not required, an external polymer coating, as generally shown by reference numeral 106, may also be applied to the anode body and overlie the solid electrolyte, generally shown by reference numeral 104. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 to about 500 nanometers, in some embodiments from about 80 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments, from about 5 to about 20 μm.

V. Other Components of the Capacitor

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

The capacitor may also be provided with terminations, particularly when employed in surface mounting applications. For example, the capacitor may contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIG. 1, one embodiment of an electrolytic capacitor 30 is shown that includes an anode termination 62 and a cathode termination 72 in electrical connection with a capacitor element 33. The capacitor element 33 has an upper surface 37, lower surface 39, front surface 36, and rear surface 38. Although it may be in electrical contact with any of the surfaces of the capacitor element 33, the cathode termination 72 in the illustrated embodiment is in electrical contact with the lower surface 39 and rear surface 38. More specifically, the cathode termination 72 contains a first component 73 positioned substantially perpendicular to a second component 74. The first component 73 is in electrical contact and generally parallel with the lower surface 39 of the capacitor element 33. The second component 74 is in electrical contact and generally parallel to the rear surface 38 of the capacitor element 33. Although depicted as being integral, it should be understood that these portions may alternatively be separate pieces that are connected together, either directly or via an additional conductive element (e.g., metal).

The anode termination 62 likewise contains a first component 63 positioned substantially perpendicular to a second component 64. The first component 63 is in electrical contact and generally parallel with the lower surface 39 of the capacitor element 33. The second component 64 contains a region 51 that carries an anode lead 16. In the illustrated embodiment, the region 51 possesses a "U-shape" for further enhancing surface contact and mechanical stability of the lead 16.

The terminations may be connected to the capacitor element using any technique known in the art. In one embodiment, for example, a lead frame may be provided that defines the cathode termination 72 and anode termination 62. To attach the electrolytic capacitor element 33 to the lead frame, a conductive adhesive may initially be applied to a surface of the cathode termination 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes. Any of a variety of techniques may be used to apply the conductive adhesive to the cathode termination 72. Printing techniques, for instance, may be employed due to their practical and cost-saving benefits.

A variety of methods may generally be employed to attach the terminations to the capacitor. In one embodiment, for example, the second component 64 of the anode termination 62 and the second component 74 of the cathode termination 72 are initially bent upward to the position shown in FIG. 1. Thereafter, the capacitor element 33 is positioned on the cathode termination 72 so that its lower surface 39 contacts the adhesive and the anode lead 16 is received by the upper U-shaped region 51. If desired, an insulating material (not shown), such as a plastic pad or tape, may be positioned between the lower surface 39 of the capacitor element 33 and the first component 63 of the anode termination 62 to electrically isolate the anode and cathode terminations.

The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive.

Once the capacitor element is attached, the lead frame is enclosed within a resin casing, which may then be filled with silica or any other known encapsulating material. The width and length of the case may vary depending on the intended application. Suitable casings may include, for instance, "A", "B", "C", "D", "E", "F", "G", "H", "J", "K", "L", "M", "N", "P", "R", "S", "T", "V", "W", "Y", "X", or "Z" (AVX Corporation). Regardless of the case size employed, the capacitor element is encapsulated so that at least a portion of the anode and cathode terminations are exposed for mounting onto a circuit board. As shown in FIG. 1, for instance, the capacitor element 33 is encapsulated in a case 28 so that a portion of the anode termination 62 and a portion of the cathode termination 72 are exposed.

As a result of the present invention, the capacitor assembly may exhibit excellent electrical properties. For example, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and uF*V is the product of the capacitance and the rated voltage. Such normalized leakage current values may even be maintained after aging for a substantial amount of time at high temperatures. For example, the values may be maintained for about 100 hours or more, in some embodiments from about 300 hours to about 3000 hours, and in some embodiments, from about 400 hours to about 2500 hours (e.g., 500 hours, 600 hours, 700 hours, 800 hours, 900 hours, 1000 hours, 1100 hours, 1200 hours, or 2000 hours) at temperatures ranging from about −55° C. to about 250° C., in some embodiments from about 0° C. to about 225° C., and in some embodiments, from about 10° C. to about 225° C.

The present invention may be better understood by reference to the following examples.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was room temperature.

Dry and Wet Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was room temperature. The "dry capacitance" refers to the capacitance of the part after application of the solid electrolyte, graphite, and silver layers, while the "wet capacitance" refers to the capacitance of the part after formation of the dielectric, measured in 17% sulfuric acid in reference to 1 mF tantalum cathode.

Temperature Stability Characteristics:

Temperature stability was conducted at the temperature of 125° C. without voltage. The ESR and capacitance of an individual capacitor were recorded after 3, 6, 12 and 18 days.

Example 1

70,000 μFV/g tantalum powder was used to form anode samples. Each anode sample was embedded with a tantalum wire, sintered at 1280° C., and pressed to a density of 6.8 g/cm3. The resulting pellets had a size of 1.80×1.20×2.40 mm. The pellets were anodized to 14.4V in water/phosphoric acid electrolyte with conductivity 8.6 mS at temperature of 85° C. to form the dielectric layer. A conductive polymer coating was then formed by dipping the anodes into a butanol solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 12 times. The parts were then dipped into a graphite dispersion and dried. Finally, the parts were dipped into a silver dispersion and dried. Multiple parts (200) of 150 μF/6.3V capacitors were made in this manner.

Example 2

Capacitors were formed in the manner described in Example 1, except that using a different conductive polymer coating. A conductive polymer coating was then formed by dipping the anodes into a butanol solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. This process was repeated 6 times. Thereafter, the parts were dipped into a dispersed poly(3,4-ethylenedioxythiophene) having a solids content 2% and viscosity 20 mPa·s (Clevios™ K, H. C. Starck). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts (200) of 150 μF/6.3V capacitors were made in this manner.

Example 3

Capacitors were formed in the manner described in Example 1, except that using a different conductive polymer coating. A conductive polymer coating was then formed by dipping the anodes into a butanol solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. This process was repeated 6 times. Thereafter, the parts were dipped into a dispersed poly(3,4-ethylenedioxythiophene) having a solids content 2% and viscosity 20 mPa·s (Clevios™ K, H. C. Starck) and additional 20% solids content of poly(ethylene glycol) with molecular weight 600 (Sigma Aldrich®). Upon coating, the parts were dried at 125° C. for 20 minutes. This process was not repeated. Thereafter, the parts were dipped into a dispersed poly(3,4-ethylenedioxythiophene) having a solids content 2% and viscosity 160 mPa·s (Clevios™ K, H. C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts (200) of 150 μF/6.3V capacitors were made in this manner.

The finished capacitors of Examples 1-3 were then tested for electrical performance before an assembly process. The median results of ESR and capacitance are set forth below in Table 1. The wet capacitance was 145.0 μF in all examples.

TABLE 1

| | Electrical Properties | | |
|---|---|---|---|
| | Cap [μF] | Dry/Wet Cap [%] | ESR [mΩ] |
| Example 1 | 144.7 | 99.8 | 65 |
| Example 2 | 120.2 | 82.9 | 44 |
| Example 3 | 129.2 | 89.1 | 45 |

The finished capacitors of Examples 1-3 were also tested for temperature stability characteristics without voltage before an assembly process. The median results of ESR and capacitance are set forth below in Table 2a,b.

TABLE 2a

| Temperature Stability Characteristics (ESR [mΩ]) | | | | |
|---|---|---|---|---|
| | 3 days | 6 days | 12 days | 18 days |
| Example 1 | 69 | 138 | 574 | N/A |
| Example 2 | 56 | 69 | 110 | 227 |
| Example 3 | 51 | 61 | 83 | 132 |

TABLE 2b

| Temperature Stability Characteristics (Cap [μF]) | | | | |
|---|---|---|---|---|
| | 3 days | 6 days | 12 days | 18 days |
| Example 1 | 140.3 | 129.6 | 39.7 | 20.7 |
| Example 2 | 117.3 | 110.6 | 83.6 | 49.9 |
| Example 3 | 109.8 | 104.6 | 96.0 | 87.6 |

As indicated, the parts with polyethylene glycol (Example 3) had a higher stability under elevated temperature.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
   a sintered porous anode;
   a dielectric layer that overlies the anode body; and
   a solid electrolyte overlying the dielectric layer, wherein the solid electrolyte comprises an in situ polymerized conductive polymer and a hydroxy-functional nonionic polymer, wherein the conductive polymer is a substituted polythiophene, and wherein the hydroxy-functional nonionic polymer is a polyalkylene glycol; and
   further comprising an external polymer coating that overlies the solid electrolyte, wherein the external polymer coating contains a plurality of pre-polymerized conductive polymer particles.

2. The solid electrolytic capacitor of claim 1, wherein the hydroxy-functional nonionic polymer has a molecular weight of from about 300 to about 1,200 grams per mole.

3. The solid electrolytic capacitor of claim 1, wherein the solid electrolyte contains a first layer that overlies the dielectric layer and a second layer that overlies the first layer, the first layer containing the in situ polymerized conductive polymer and the second layer containing the hydroxy-functional nonionic polymer.

4. The solid electrolytic capacitor of claim 3, wherein the second layer further contains a plurality of pre-polymerized conductive polymer particles.

5. The solid electrolytic capacitor of claim 4, wherein the particles contain poly(3,4-ethylenedioxythiophene).

6. The solid electrolytic capacitor of claim 4, wherein the particles contain a monomeric or polymeric counteranion.

7. The solid electrolytic capacitor of claim 1, wherein the external polymer coating contains a first layer that overlies the solid electrolyte and a second layer that overlies the first layer, wherein the first layer contains a crosslinking agent and the second layer contains the pre-polymerized conductive polymer particles.

8. The solid electrolytic capacitor of claim 1, further comprising an anode termination that is electrically connected to the anode and a cathode termination that is electrically connected to the solid electrolyte.

9. The solid electrolytic capacitor of claim 1, wherein the capacitor exhibits an equivalence series resistance of about 100 mohms or less at a temperature of −55° C. and an operating frequency of 100 kHz.

10. A method for forming a solid electrolytic capacitor, the method comprising:
    anodically oxidizing a sintered porous anode to form a dielectric, layer that overlies the anode;
    forming a solid electrolyte over the dielectric layer by a process that includes chemically polymerizing a monomer in situ to form a conductive polymer, and thereafter, applying a hydroxy-functional nonionic polymer, wherein the conductive polymer is a substituted polythiophene, and wherein the hydroxy-functional nonionic polymer is a polyalkylene glycol; and
    forging an external polymer coating that overlies the solid electrolyte, wherein the external polymer coating contains a plurality of pre-polymerized conductive polymer particles.

11. The method of claim 10, wherein the hydroxy-functional nonionic polymer has a molecular weight of from about 300 to about 1,200 grams per mole.

12. The method of claim 10, wherein hydroxy-functional nonionic polymer is applied in the form of a dispersion that contains a plurality of pre-polymerized conductive polymer particles.

13. The method of claim 10, wherein the hydroxy-functional nonionic polymer is applied in the font of a solution.

* * * * *